United States Patent
Conaway et al.

(10) Patent No.: US 9,688,327 B2
(45) Date of Patent: Jun. 27, 2017

(54) AUXILIARY AXLE AND SUSPENSION ASSEMBLY

(71) Applicant: SAF-HOLLAND, Inc., Holland, MI (US)

(72) Inventors: Richard Conaway, Grand Haven, MI (US); Daniel R. Dykstra, Grand Rapids, MI (US); Marc Johnson, Muskegon, MI (US); Doug Thole, Muskegon, MI (US); Boyd Freeman, Muskegon, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 0 days.

(21) Appl. No.: 15/205,711

(22) Filed: Jul. 8, 2016

(65) Prior Publication Data

US 2016/0318567 A1    Nov. 3, 2016

Related U.S. Application Data

(63) Continuation of application No. 14/616,055, filed on Feb. 6, 2015, now Pat. No. 9,481,416, which is a
(Continued)

(51) Int. Cl.
*B62D 65/12* (2006.01)
*B62D 7/18* (2006.01)
(Continued)

(52) U.S. Cl.
CPC ............ *B62D 65/12* (2013.01); *B60B 35/003* (2013.01); *B60B 35/007* (2013.01);
(Continued)

(58) Field of Classification Search
CPC .............................. B60G 2206/50; B62D 7/18
(Continued)

(56) References Cited

U.S. PATENT DOCUMENTS 1,828,425 A    10/1931  Matthews
1,932,340 A    10/1933  Goltry
(Continued)

FOREIGN PATENT DOCUMENTS

DE    102005051193 A1  *  4/2007  ............. B60G 15/07

OTHER PUBLICATIONS

Silent Drive, Inc., Maxie DB Hydraulic Raise & Lower Air Ride Suspension, Nov. 27, 2005. vol. 1.
(Continued)

*Primary Examiner* — James English
(74) *Attorney, Agent, or Firm* — Price Heneveld LLP

(57) ABSTRACT

A vehicle suspension assembly includes providing an axle assembly having a first end including a first mounting structure and a second end, providing a first bearing block and a second bearing block, forming a first aperture in the first bearing block and a second aperture in the second bearing block, attaching the first and second bearing blocks to the first mounting structure subsequent to forming the first and second apertures; and providing a first spindle assembly coupled to the first mounting structure by a first spherical bearing located within the first aperture and a second spherical bearing located within the second aperture, wherein a first kingpin assembly extends through the first and second spherical bearings, thereby coupling the first spindle with the first mounting structure.

12 Claims, 11 Drawing Sheets

Related U.S. Application Data continuation of application No. 14/132,752, filed on Dec. 18, 2013, now Pat. No. 9,290,221.

(60) Provisional application No. 61/757,471, filed on Jan. 28, 2013.

(51) Int. Cl.

| | | |
|---|---|---|
| *B60G 9/02* | (2006.01) | |
| *B62D 7/14* | (2006.01) | |
| *B62D 13/06* | (2006.01) | |
| *B60G 5/04* | (2006.01) | |
| *B60G 11/27* | (2006.01) | |
| *B60G 11/28* | (2006.01) | |
| *B62D 9/00* | (2006.01) | |
| *B62D 61/12* | (2006.01) | |
| *B60B 35/00* | (2006.01) | |
| *B60B 35/08* | (2006.01) | |

(52) U.S. Cl.
CPC ............ *B60B 35/008* (2013.01); *B60B 35/08* (2013.01); *B60G 5/04* (2013.01); *B60G 9/02* (2013.01); *B60G 11/27* (2013.01); *B60G 11/28* (2013.01); *B62D 7/144* (2013.01); *B62D 7/18* (2013.01); *B62D 9/00* (2013.01); *B62D 13/06* (2013.01); *B62D 61/125* (2013.01); *B60G 2200/30* (2013.01); *B60G 2200/314* (2013.01); *B60G 2200/44* (2013.01); *B60G 2200/445* (2013.01); *B60G 2202/152* (2013.01); *B60G 2202/412* (2013.01); *B60G 2204/126* (2013.01); *B60G 2204/143* (2013.01); *B60G 2204/148* (2013.01); *B60G 2204/418* (2013.01); *B60G 2204/43* (2013.01); *B60G 2204/4302* (2013.01); *B60G 2204/4702* (2013.01); *B60G 2206/32* (2013.01); *B60G 2206/50* (2013.01); *B60G 2206/601* (2013.01); *B60G 2206/8201* (2013.01); *B60G 2300/02* (2013.01); *B60G 2300/026* (2013.01); *B60G 2300/04* (2013.01); *B60G 2300/042* (2013.01); *Y10T 29/49622* (2015.01)

(58) Field of Classification Search
USPC .................................................. 280/93.512
See application file for complete search history.

(56) References Cited

U.S. PATENT DOCUMENTS

| | | | |
|---|---|---|---|
| 3,191,954 A | 6/1965 | Schuetz | |
| 3,282,601 A | 11/1966 | Harbers | |
| 3,477,738 A | 11/1969 | Manning | |
| 4,079,798 A | 3/1978 | Ferris | |
| 4,171,830 A | 10/1979 | Metz | |
| 5,015,004 A | 5/1991 | Mitchell | |
| 5,090,495 A | 2/1992 | Christenson | |
| 5,230,528 A | 7/1993 | Van Raden et al. | |
| 5,303,946 A | 4/1994 | Youmans et al. | |
| 5,540,454 A | 7/1996 | VanDenberg et al. | |
| 5,549,322 A | 8/1996 | Hauri | |
| 5,597,174 A | 1/1997 | Christenson et al. | |
| 5,865,452 A | 2/1999 | Chalin | |
| 6,036,201 A | 3/2000 | Pond et al. | |
| 6,062,578 A | 5/2000 | Richardson | |
| 6,073,946 A | 6/2000 | Richardson | |
| 6,182,984 B1 | 2/2001 | Chalin | |
| 6,213,647 B1 | 4/2001 | Lin | |
| 6,247,713 B1 | 6/2001 | Konop | |
| 6,398,236 B1 | 6/2002 | Richardson | |
| 6,616,156 B1 | 9/2003 | Dudding et al. | |
| 6,796,566 B2 | 9/2004 | VanDenberg | |
| 6,808,189 B1 | 10/2004 | Schlosser et al. | |
| 6,845,989 B2 | 1/2005 | Fulton et al. | |
| 6,880,839 B2 | 4/2005 | Keeler et al. | |
| 6,883,813 B2 | 4/2005 | Gottschalk | |
| 6,902,176 B2 | 6/2005 | Gottschalk | |
| 7,152,866 B2 | 12/2006 | Chalin et al. | |
| 7,311,446 B2 * | 12/2007 | Koschinat | B60G 7/02 384/221 |
| 7,322,587 B2 | 1/2008 | Chalin et al. | |
| 7,360,773 B2 | 4/2008 | Gottschalk | |
| 7,530,583 B2 | 5/2009 | Gottschalk | |
| 7,618,049 B2 | 11/2009 | Varela et al. | |
| 7,845,658 B2 | 12/2010 | Chalin et al. | |
| 7,862,058 B2 | 1/2011 | Bubulka et al. | |
| 2004/0262874 A1 | 12/2004 | Lorente | |
| 2005/0151337 A1 | 7/2005 | Chalin et al. | |
| 2005/0180670 A1 * | 8/2005 | Koschinat | B60G 7/02 384/428 |
| 2007/0040343 A1 | 2/2007 | Chalin et al. | |
| 2008/0290723 A1 | 11/2008 | Gottschalk | |
| 2011/0057406 A1 | 3/2011 | Chalin et al. | |
| 2011/0079459 A1 | 4/2011 | Gottschalk et al. | |
| 2011/0115184 A1 | 5/2011 | Johnson et al. | |
| 2011/0163514 A1 | 7/2011 | Saieg et al. | |

OTHER PUBLICATIONS

Silent Drive, Inc., AAS-770 Air Suspension Self-Steering, Nov. 27, 2005, vol. 1.
Silent Drive, Inc., Tag & Pusher Axles Application Charts, 2006.
Silent Drive, Inc., AAS-747-13FA Series Air Suspension, Mar. 12, 2008, vol. 1.
Silent Drive, Inc., AAS-747-8 Series Air Suspension, Mar. 12, 2008, vol. 1.
Silent Drive, Inc., AAS-747-12 Series Air Suspension, Mar. 12, 2008, vol. 1.
Silent Drive, Inc., AAS-747-13 Series Air Suspension, Mar. 12, 2008, vol. 1.
Silent Drive, Inc., AAS-737-20 Series Parallelogram Air Suspensions, Nov. 27, 2005, vol. 1.
Silent Drive, Inc., AAS-740 Series Parallelogram Air Suspension, Nov. 27, 2005, vol. 1.
Silent Drive, Inc., More Features . . . More Benefits.
Silent Drive, Inc., AA-115 Air Suspension Non-Steer flyer, Nov. 27, 2005, vol. 1.
Silent Drive, Inc., AA-135 High Lift Air Suspension Non-Steer flyer, Nov. 27, 2005, vol. 1.
Silent Drive, Inc., AA-1355 Series Air Suspensions Non-Steer flyer, Nov. 27, 2005, vol. 1.
Silent Drive, Inc., AA-1455 Air Suspension Non-Steer flyer, Nov. 27, 2005, vol. 1.
Silent Drive, Inc., AA-230-INB Series Air Lift Air Suspension Non-Steer flyer, Nov. 27, 2005, vol. 1.
Silent Drive, Inc., AAS-240 Series, Air Suspension Self-Steering flyer, Nov. 27, 2005, vol. 1.
Silent Drive, Inc., AA-270 Air Suspension Non-Steer flyer, Nov. 27, 2005, vol. 1.
Silent Drive, Inc., AA-270-FD Air Suspension Non-Steer Drop Axle flyer, Nov. 27, 2005, vol. 1.
Silent Drive, Inc., AAS-114 Series Self-Steering Air-Suspension flyer, Nov. 27, 2005, vol. 1.
Silent Drive, Inc., AAS-115 Air Suspension Self-Steering flyer, Nov. 27, 2005, vol. 1.
Silent Drive, Inc., AAS-1355 Air Suspension Self-Steering flyer, Nov. 27, 2005, vol. 1.
Silent Drive, Inc., AAS-713 Air Suspension Self-Steering flyer, Nov. 27, 2005, vol. 1.
Silent Drive, Inc., AAS-721 Series Parallelogram Air Suspension flyer, Nov. 27, 2005, vol. 1.
Silent Drive, Inc., AAS-721-FA Series Parallelogram Air Suspension flyer, Nov. 27, 2005, vol. 1.
Silent Drive, Inc., AAS-724 Series Parallelogram Air Suspension flyer, Nov. 27, 2005, vol. 1.
Silent Drive, Inc., AAS-727-SH Series Parallelogram Air Suspension flyer, Nov. 27, 2005, vol. 1.

(56) References Cited

OTHER PUBLICATIONS

Hendrickson, Lift Axles Full Line of Auxiliary Lift Axles brochure, Mar. 2009.
Hendrickson, HLM-2 Series Specifications brochure, Jan. 2006.
Hendrickson, HLN Series Specifications brochure, Aug. 2002.
Hendrickson, HLN Paralift Fixed Axle Suspension System web page, http://www.hendrickson-intl.com/products/product_detail/hln_paralift.asp, printed Oct. 27, 2010.
Hendrickson, HLR-2 Series Non-steer Lift Axle Systems brochure; Feb. 2003.
Hendrickson, HLR-3 Fixed Axle Suspension System web page, http://www.hendrickson-intl.com/products/prodcut_detail/hlr_3.asp, printed Oct. 26, 2010.
Hendrickson, Paralift Steerable Suspension System brochure, Feb. 2009.
Hendrickson, Composilite ST Composilite STS Specifications brochure, Jun. 2005.
Hendrickson, Pararev—Next Generation Technology flyer.
Hendrickson, Composilite FBC Light-duty Steerable for Federal Bridge Formula Compliance brochure, Jan. 2007.
Hendrickson, Composilite FX Fixed-axle Suspension System brochure, Mar. 2004.
Hendrickson, Composilite RO for Roll-off Applications brochure, Apr. 2008.
Hendrickson, Composilite SC Family of Steerable Lift Axles brochure, Feb. 2010.
Hendrickson, Composilite ST Steerable Lift Axle System brochure, Mar. 2007.
Hendrickson, HLUR-2 Pararev Specifications, Dec. 2004.
Hendrickson, Reverse Steerable Suspension System Technical Procedures manual, Aug. 2002.
Hendrickson, Pararev Integrated Reverse Castor, Steel Axle System flyer.
Hendrickson, TLA Series Tag Lift Axle flyer.
Reyco Granning Suspensions, MaxiMiser Series Model L132LW Light Weight Parallelogram Suspension with Self-Steering Axles Specification Sheet, Sep. 9, 2004.
Reyco Granning Suspensions, Model L225 Lift Air Ride Air Lift Suspension Specification Sheet, Aug. 20, 2004.
Reyco Granning Suspensions, Model T200AX Extra-High Lift Air Ride Air Lift Suspensions Specification Sheet, Aug. 20, 2004.
Ridewell Suspensions, RCA-215 Flex-Mount Non-Steerable Auxiliary Axle Suspension flyer.
Ridewell Suspensions, Flex-Trac 232-13K Self-Steering Auxiliary Axle Suspension flyer.
Ridewell Suspensions, Flex-Trac 232-20K Self-Steering Auxiliary Axle Suspension flyer.
Ridewell Suspensions, Flex-Trac 232-8K Self-Steering Auxiliary Axle Suspension flyer.
Ridewell Suspensions, Next Generation RUL-245 "Bantamweight" flyer.
Ridewell Suspensions, RSS-232-13K Flex-Trac web page, http://www.ridewellcorp.com/Web/Site.nsf/ID/RSS-232-135; printed May 27, 2010.
SAF-Holland, Inc., Steering Tag Axle Assembly drawing.
Otto Sauer Achsenfabrik GMBH; SAF Air Suspended Tag Axles for Commercial Vehicles brochure,Oct. 2005.
Link MFG. LTD., Duromax Roll Off (8A000705) Installations Instructions, Aug. 10, 2003.
Link MFG. LTD., 8A000715 Duralift II Installation Instructions, Oct. 2, 2009.
Link MFG. LTD., Model 5500 Installation Instructions, Jan. 6, 2014.
Link MFG. Ltd., 20K Duralift II Installation Instructions, Oct. 3, 2009.
Link MFG. LTD., Duramax (8A000450) Installation Instructions, Aug. 10, 2013.
Link MFG. LTD., Model 6000 for Roll-Off Applications Installation Instructions, Apr. 11, 2005.
Link MFG. LTD., Model 6000 Installation Instructions, Jan. 4, 2014.
Watson & Chalin, MFG., AL-12001160011900DB Series High Lift Non-Steerable Tag Lift Axle flyer.
Watson & Chalin, MFG., AL-1300 Series Non-Steerable Lift Axle flyer.
Watson & Chalin, MFG., AL-2200 Series Non-Steerable Lift Axle flyer.
Watson & Chalin, MFG., AL-2300 Series Non-Steerable Lift Axle flyer.
Watson & Chalin, MFG., AL-800 Series Non-Steerable Lift Axle Suspenion flyer.
Watson & Chalin, MFG., RSL-1186TT Reverse Steer Tru-Track flyer.
Watson & Chalin, MFG., SL-0890 Series Tru-Track Super Alumilite flyer.
Watson & Chalin, MFG., SL-0893 Series Tru-Track Super Alumilite flyer.
Watson & Chalin, MFG., SL-1093 10K Tru-Track Alumilite flyer.
Watson & Chalin, MFG., SL-1152TT RO Tru-Track Series flyer.
Watson & Chalin, MFG., SL-1185TTHL Self-Steering Axle & Suspension System web page, http://www.watsonsuspensions.com/prods/series.php?p=51, printed Oct. 16, 2010.
Watson & Chalin, MFG., SL-11877TT Tru-Track Series flyer.
Watson & Chalin, MFG., SL-1188 Series Tru-Track Lite flyer.
Watson & Chalin, MFG., SL-1190TT Series Tru-Track Alumilite flyer.
Watson & Chalin, MFG., SL-1193 THL Hydraulic Tag Lift Axle flyer.
Watson & Chalin, MFG., SL-2055 20K Tru-Track flyer.
Watson & Chalin, MFG., SL-2089TT Series 20K Tru-Track flyer.
Watson & Chalin, MFG., Tru-Track Series Steerable Axle Lift Suspension, Installation and Operation Manual, 2003.

* cited by examiner

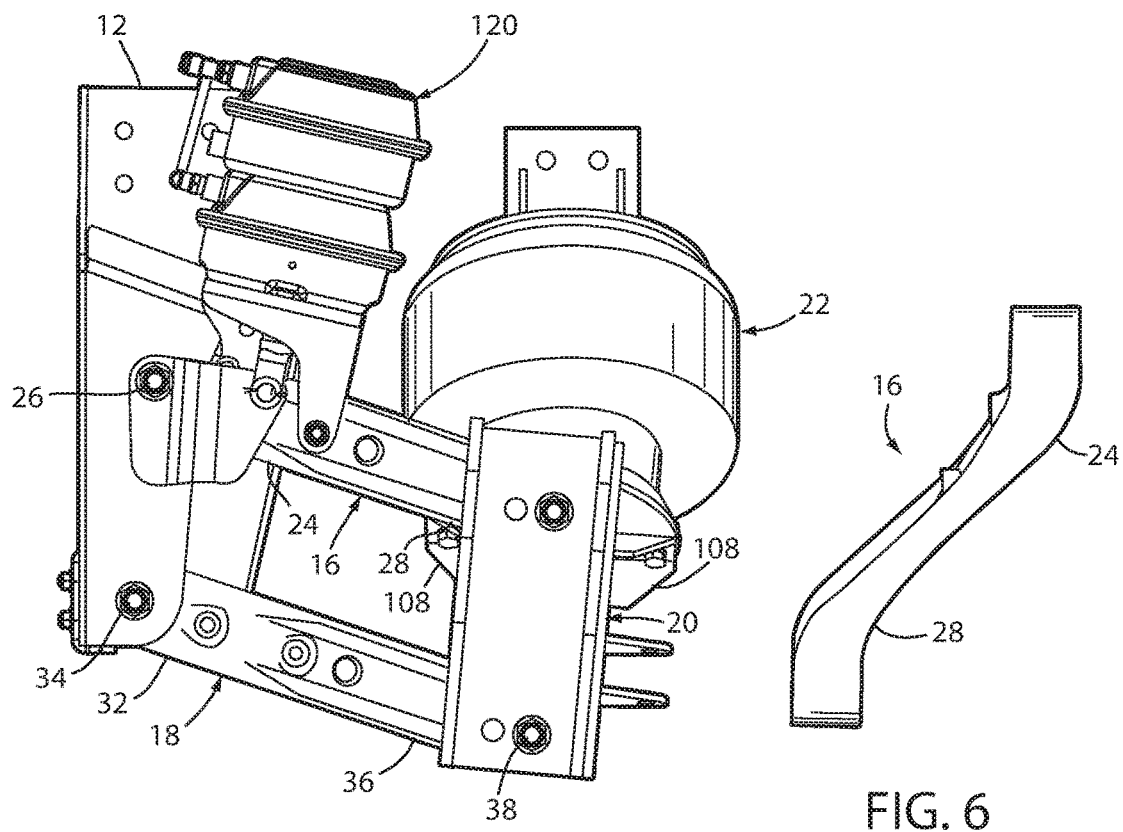
FIG. 5
FIG. 6
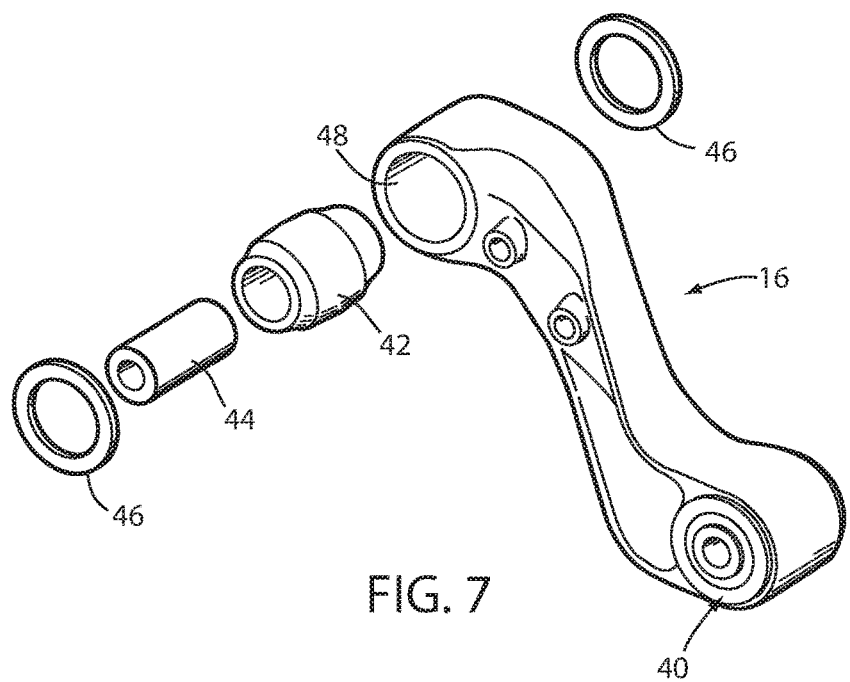
FIG. 7

AUXILIARY AXLE AND SUSPENSION ASSEMBLY

BACKGROUND OF THE INVENTION

The present invention relates to heavy duty vehicle suspensions and assemblies, and particularly to suspension assemblies incorporating a trailing arm-type configuration. More particularly, the present invention relates to an auxiliary vehicle suspension assembly adapted for movement between an in-use position and a storage position, and incorporating a self-steer assembly.

BRIEF SUMMARY OF THE INVENTION

An aspect of the present invention is to provide a method of assembling a vehicle suspension assembly comprising providing an axle assembly having a first end including a first mounting structure and a second end, providing a first bearing block and a second bearing block, forming a first aperture in the first bearing block and a second aperture in the second bearing block, attaching the first and second bearing blocks to the first mounting structure subsequent to forming the first and second apertures, and providing a first spindle assembly coupled to the first mounting structure by a first spherical bearing located within the first aperture and a second spherical bearing located within the second aperture, wherein a first kingpin assembly extends through the first and second spherical bearings, thereby coupling the first spindle with the first mounting structure.

The present inventive vehicle suspension assembly provides a durable, uncomplicated design that can be easily and quickly assembled, while simultaneously reducing manufacturing costs. The invention is efficient in use, economical to manufacture, capable of a long operating life, and is particularly well adapted to the proposed use.

These and other advantages of the present invention will be further understood and appreciated by those skilled in the art by reference to the following written specification, claims, and appended drawings.

BRIEF DESCRIPTION OF THE DRAWINGS

FIG. 5 is a side elevational view of the suspension assembly;

FIG. 6 is a top plan view of a trailing arm;

FIG. 7 is an exploded perspective view of a trailing arm assembly;

DETAILED DESCRIPTION OF EMBODIMENTS

Figure 1:
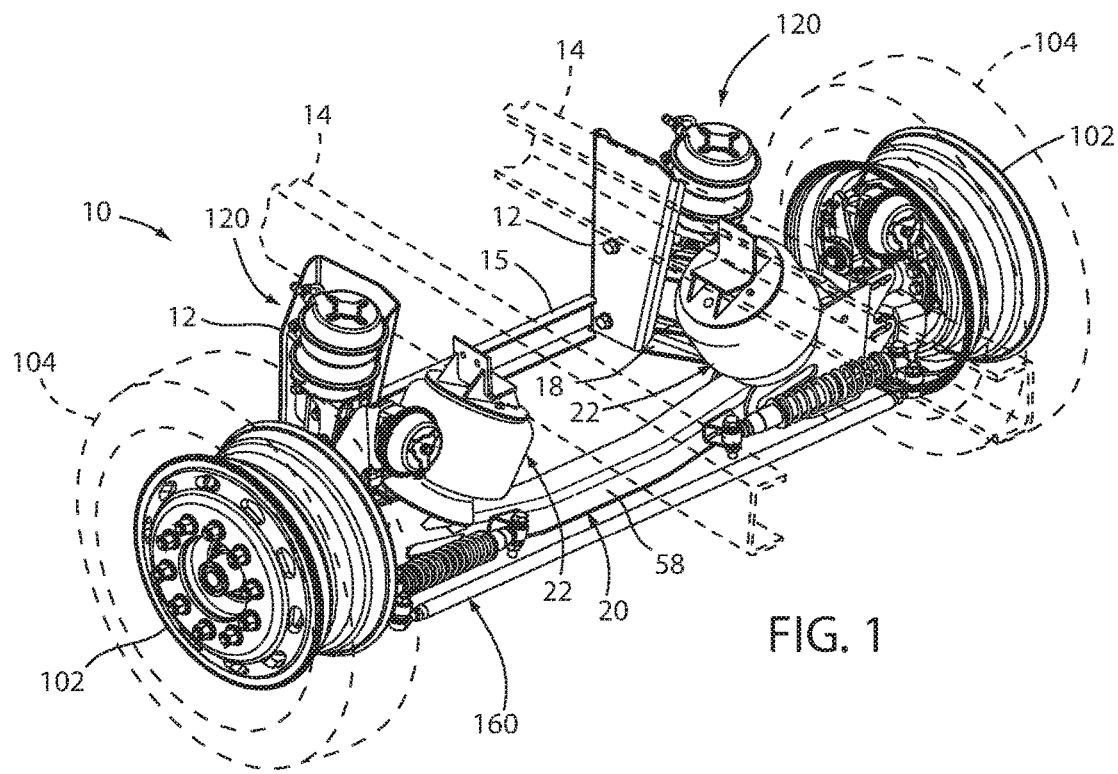
FIG. 1 is a perspective view of a vehicle suspension assembly embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

A suspension assembly 10 (FIGS. 1 and 2) comprises a pair of mounting brackets 12 fixedly connected to a pair of longitudinally extending frame members 14 of a vehicle frame assembly and coupled to one another by a cross member 15, a plurality of trailing arm assemblies including a pair of upper trailing arms 16 (FIGS. 3A-4B) and a pair of lower trailing arms 18, an axle assembly 20, and a pair of air spring assemblies 22 extending between the axle assembly 20 and corresponding frame members 14.

Figure 4A:
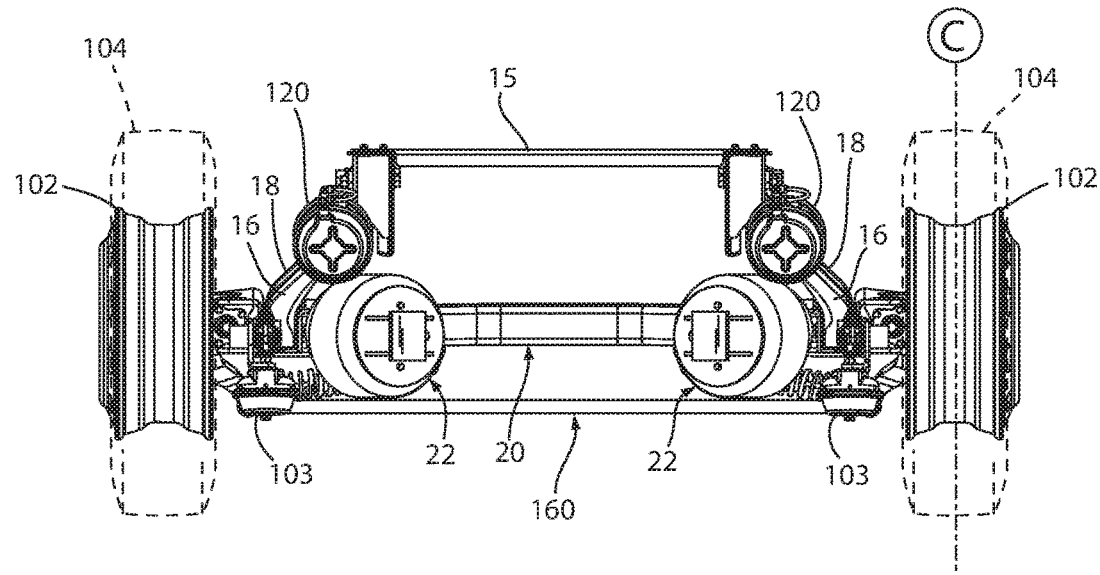
FIG. 4A is a top plan view of the vehicle suspension assembly in an inline orientation.

In the illustrated example, each upper trailing arm 16 (FIG. 5) includes a first end 24 pivotably coupled to one of the mounting brackets 12 for rotation about a pivot point 26 and a second end 28 pivotably coupled to the axle assembly 20 for rotation about a pivot point 30, as described below. Each lower trailing arm 18 includes a first end 32 pivotably secured to a mounting bracket 12 for pivoting about a pivot point 34, and a second end 36 pivotably coupled to the axle assembly 20 for pivotable movement around a pivot point 38, also as described below. FIGS. 4A and 6 illustrate the generally outward-sweeping shape of the trailing arms 16, 18 along the length of the trailing arms 16, 18 from the first end 24, 32 to the second end 28, 36. As best illustrated in FIG. 7, each end 24, 28, 32, 36 of the trailing arms 16, 18 are pivotably secured to the mounting brackets 12 and axle assembly 20 by a bushing assembly 40 comprising an elastically resilient bushing member 42, a bushing pin 44 and nylon washers 46 received within a corresponding bore 48.

Figure 8:
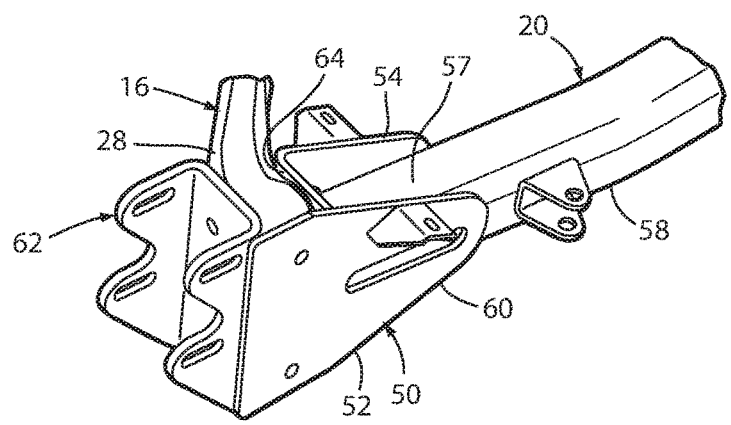
FIG. 8 is an exploded perspective view of mounting arrangement and associated connections.
Figure 9A:
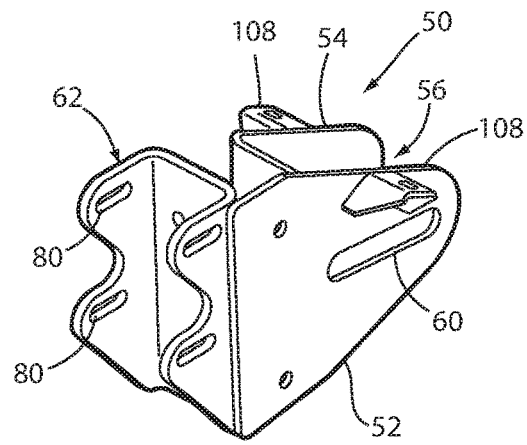
FIG. 9A is a perspective rear view of the mounting arrangement.
Figure 9B:
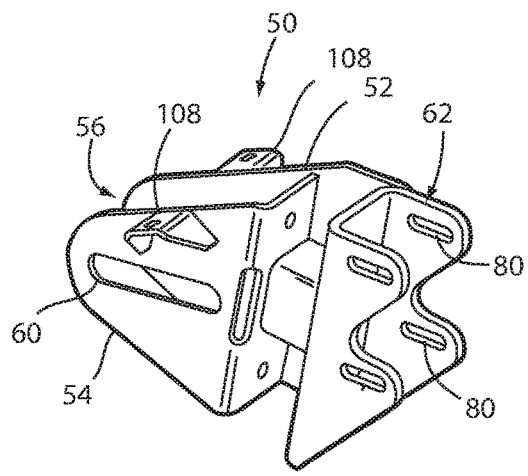
FIG. 9B is a perspective front view of the mounting arrangement.
Figure 10:
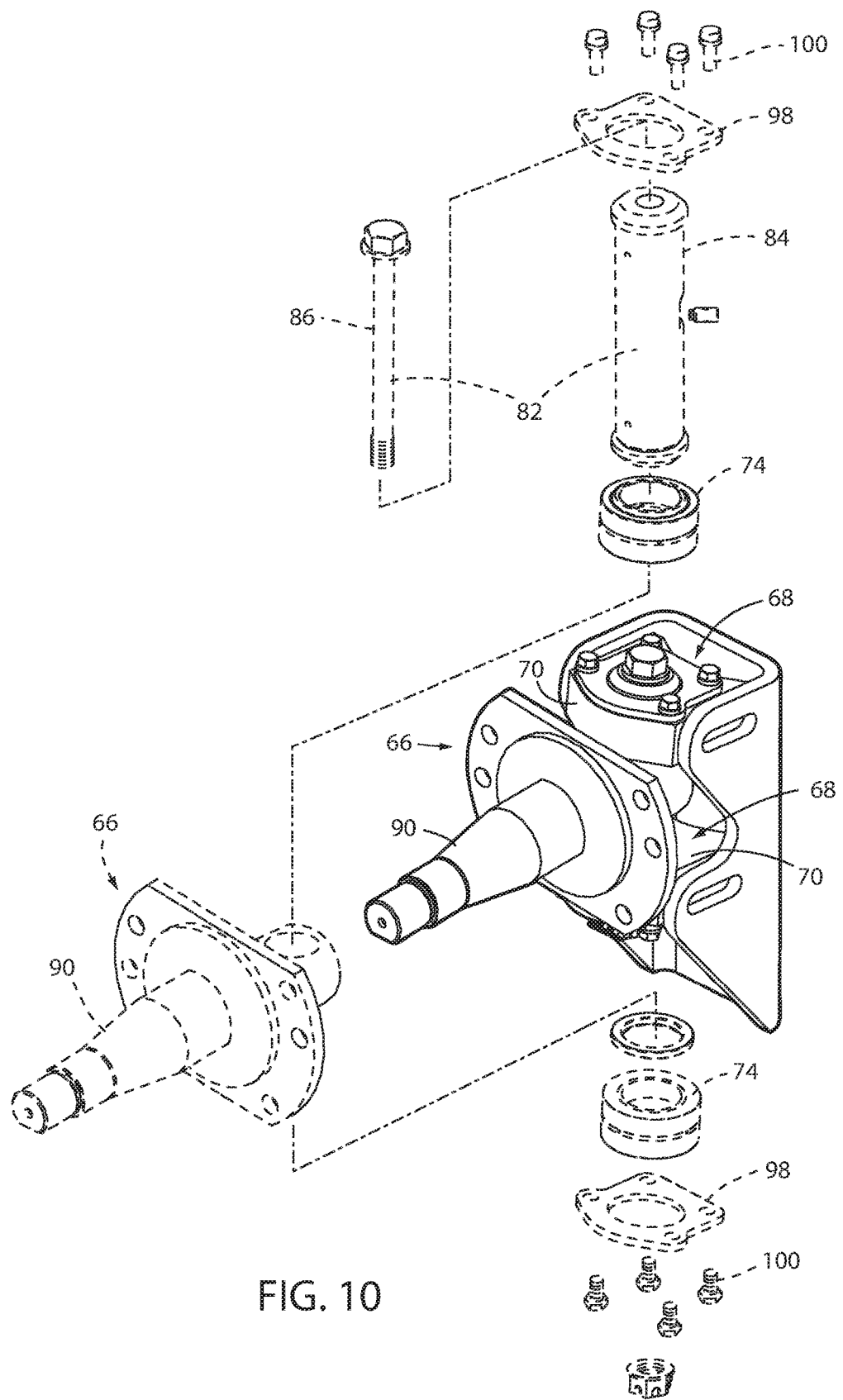
FIG. 10 is an exploded perspective view of a spindle assembly, wherein the components of the spindle assembly are shown in dashed in an exploded state and in solid in an assembled state.
Figure 11:
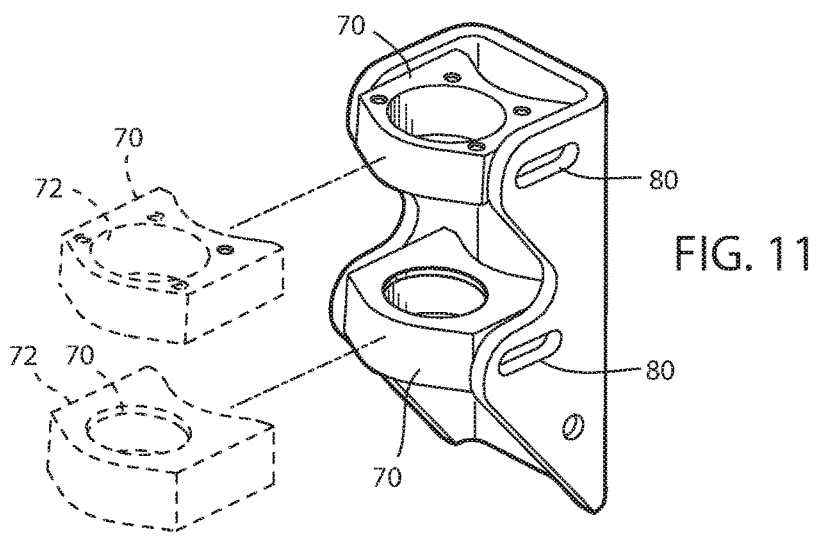
FIG. 11 is an exploded perspective view of bearing blocks and a portion of the mounting arrangement, wherein the bearing blocks are shown in dashed in the exploded state and in solid in an assembled state.
Figure 12A:
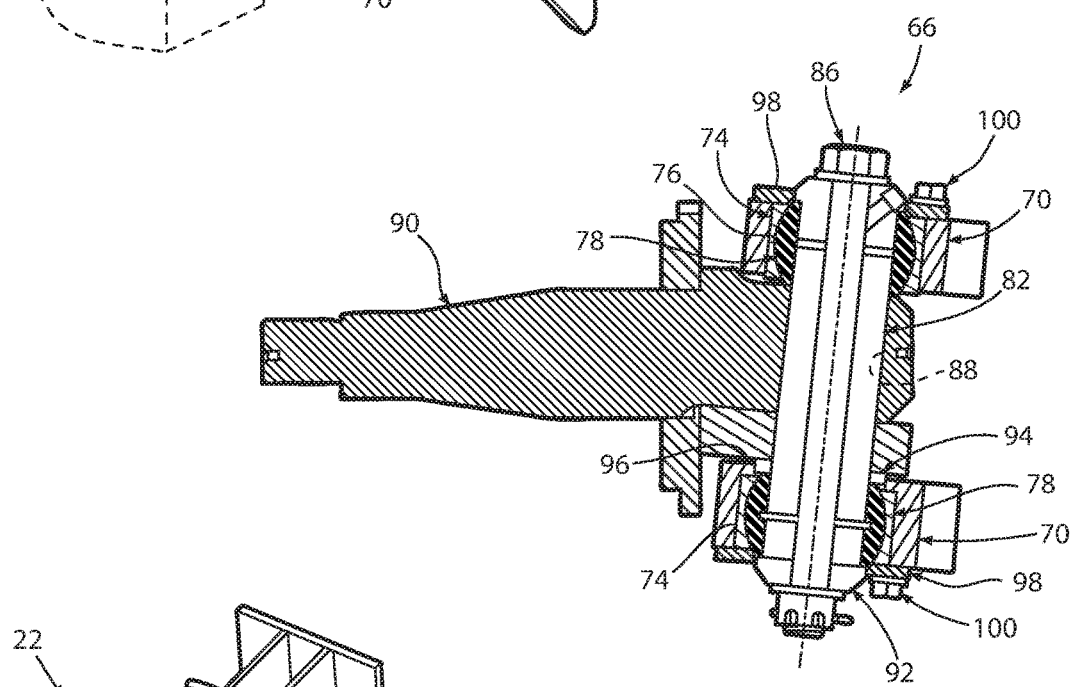
FIG. 12A is a cross-sectional view of the spindle assembly and a portion of the mounting arrangement.

As best illustrated in FIG. 8, the second end 28, 36 of each trailing arm 16, 18 are pivotably coupled to an integrated corresponding mounting arrangement 50. Each mounting arrangement 50 (FIGS. 9A and 9B) includes a triangularly-shaped rear plate 52, an L-shaped front plate 54 that cooperates with the rear plate 52 to form an inwardly-opening pocket 56 within which an end 57 of an axle member 58 of the axle assembly 20 is received. The rear plate 52 and the front plate 54 each include a welding aperture 60 about which a weld is formed to secure the end 57 of the axle 58 within the pocket 56. Each mounting arrangement 50 further includes a C-shaped spindle attachment plate 62 that is attached to the rear plate 52, and which cooperates with the rear plate 52 and the front plate 54 to form a pocket 64 within which the second ends 28, 36 of the trailing arms 16, 18 are pivotably secured. As utilized herein, the term "integrated" means that the components of the mounting arrangement 50, including the rear plate 52, the front plate 54 and the spindle attachment plate 62 are brought together with one another such that the components form a single unit and are not spaced from one another. In the illustrated example, the rear plate 52, the front plate 54 and the spindle attachment 62 are welded to one another, however these components may also be formed as a single integral piece, or coupled together with various mechanical fasteners. Spindle assemblies 66 (FIGS. 2 and 10-12A) are pivotably secured to the corresponding mounting arrangement 50 of the axle assembly 20 by a pair of bearing assemblies 68 each including a bearing block 70 having a bearing bore 72 that receives a corresponding bearing 74, each bearing 74 including a race 76 and a spherical bearing member 78. The spindle attachment plate 62 includes a plurality of elongated welding apertures 80 about which a weld is received to weld the bearing blocks 70 to the spindle attachment plate 62 of the mounting arrangement 50. It is noted that the bearing bore 72 of each of the bearing blocks 70 is machined prior to attaching the bearing block 70 to the mounting arrangement 50. A kingpin assembly 82 including an elongated kingpin collar 84 and a kingpin 86 extends through the bearings 74 and an aperture 88 of the spindle 90, thereby pivotably securing the spindle 90 to the axle assembly 20. Specifically, tightening of the kingpin 86 creates a load path extending through the kingpin collar 84, each of the spherical bearing members 78, an end of the spindle 90, and a collar member 92. Over-tightening of the kingpin 86 is prevented by a washer member 94 positioned between the lower of the spherical bearing members 78 and the spindle 90. It is noted that the lower of the bearing blocks 70 includes a collar portion 96 that abuts the race 76 of the corresponding bearing 74, thereby providing proper spacing and assisting during assembly. Specifically, the collar portion or lip 96 provides a stop for the bearing to be pressed to during assembly, thereby defining the vertical positioning for the entire spindle assembly. Further, the lip 96 is adapted to support the vertical load should the press-fit of the bearing fail. A pair of retainer plates 98 are secured to the corresponding bearing blocks 70 by a plurality of bolts 100. The hub assemblies 102, braking assemblies 103 and tires 104 are coupled to the associated spindle 90.

Figure 13:
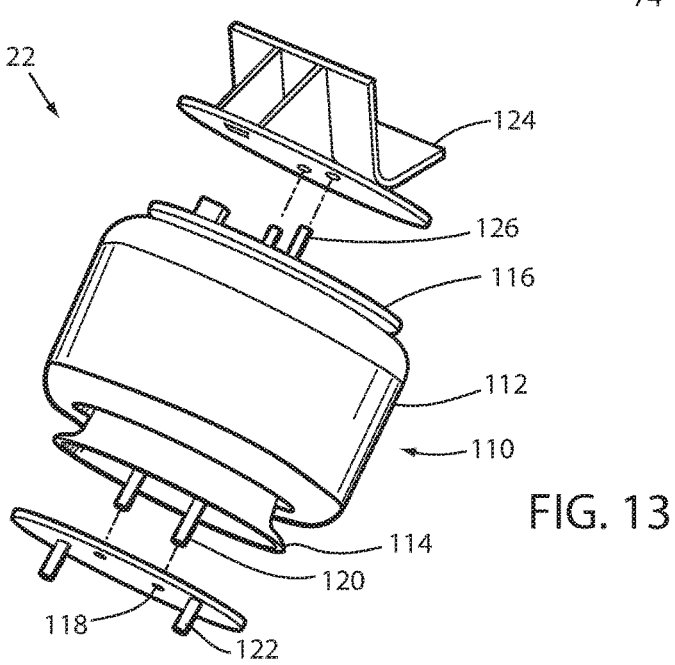
FIG. 13 is an exploded perspective view of an air spring assembly.
Figure 12B:
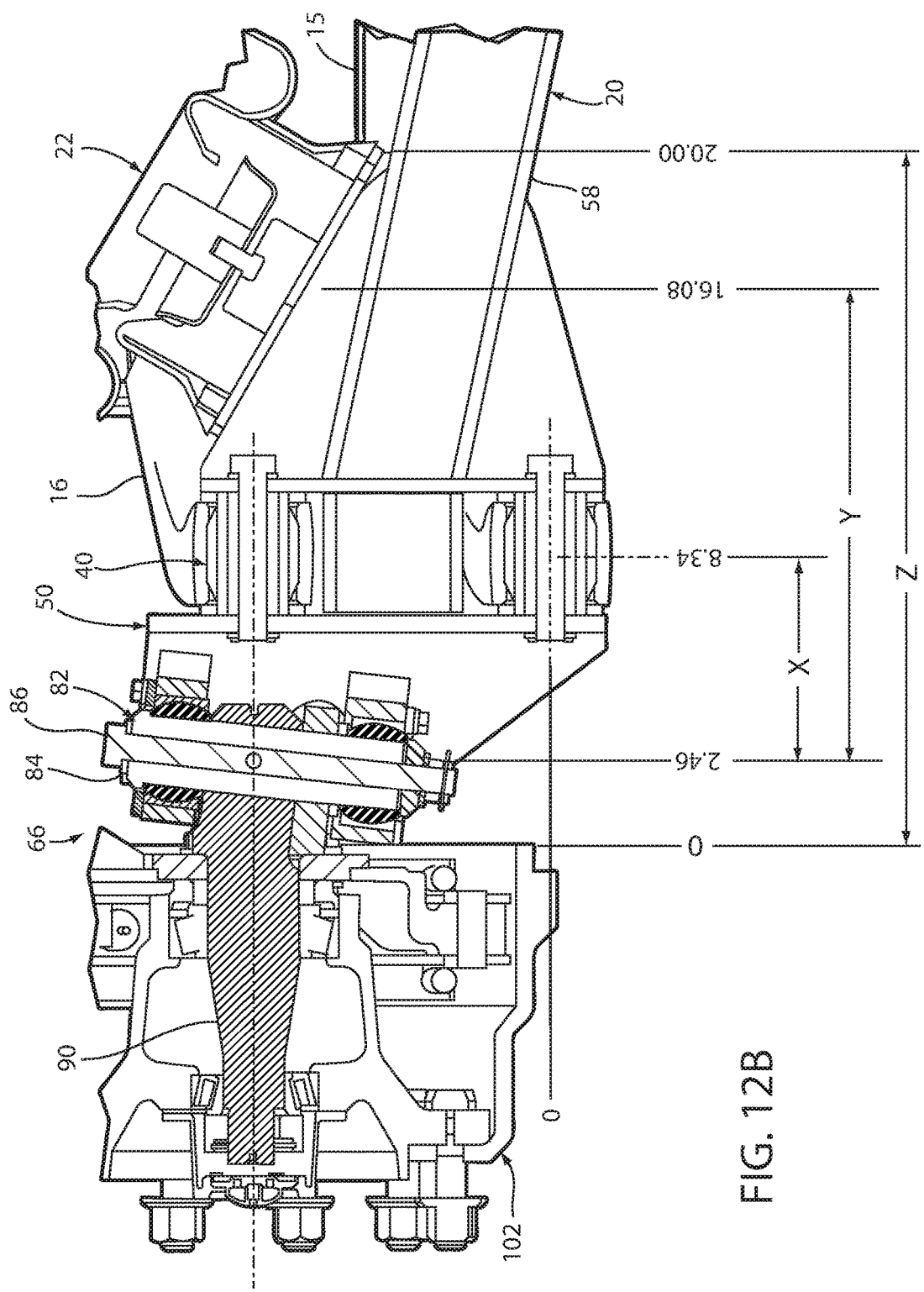
FIG. 12B is a cross-sectional view of the vehicle suspension assembly.
Figure 14:
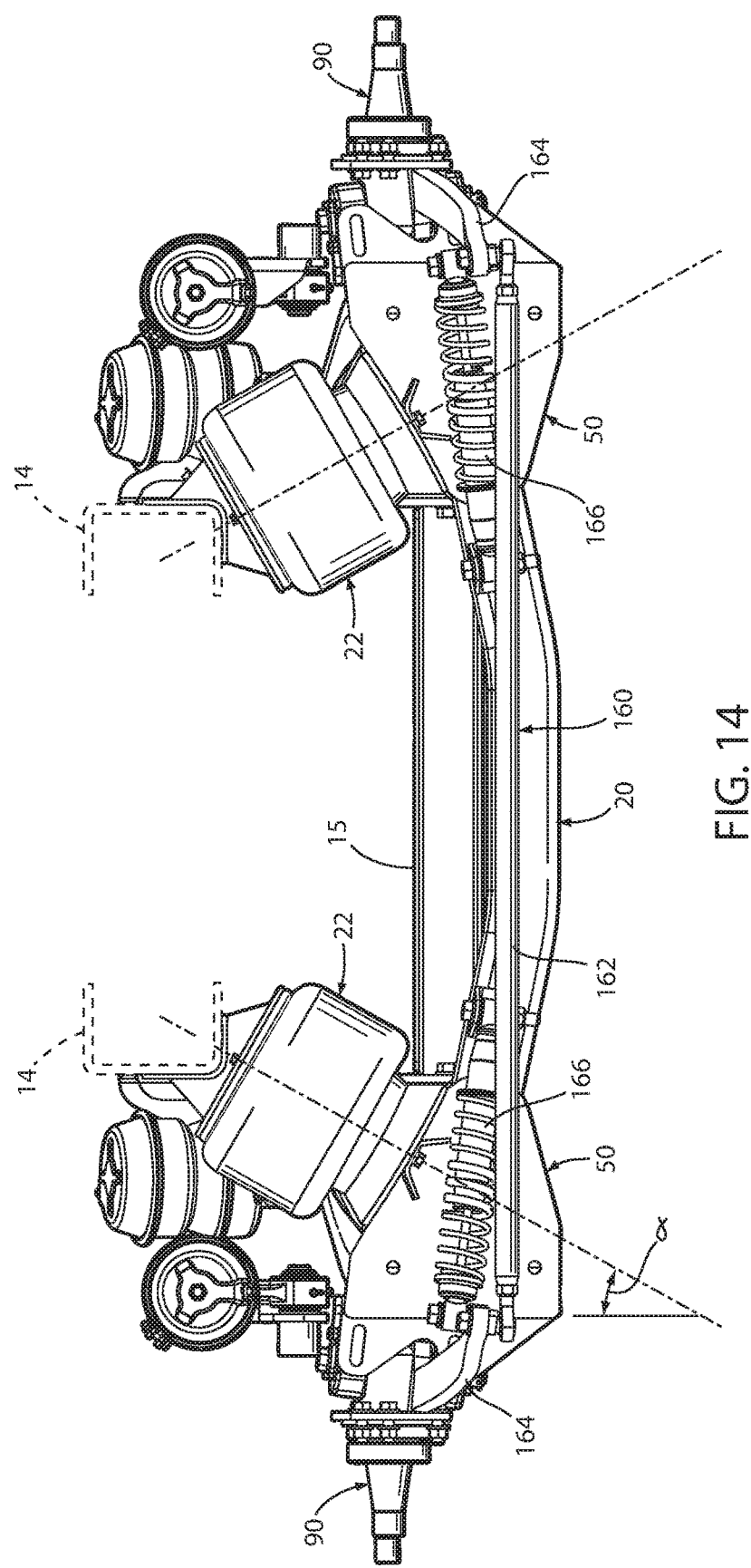
FIG. 14 is a rear elevational view of the suspension assembly.

Each mounting arrangement 50 (FIGS. 9A and 9B) includes forwardly and rearwardly extending air spring mounting brackets 108 to which the corresponding air spring assembly 22 (FIG. 5) is coupled. In the illustrated example, the air spring mounting brackets 108 are integrated with the rest of the associated mounting arrangement, including the rear plate 52, the front plate 54 and the spindle attachment bracket 62. As best illustrated in FIG. 13, each air spring assembly 22 includes a rolling lobe-style air spring 110 including an air bladder 112, an internal lobe member 114 and a top plate 116. A mounting plate 118 is secured to the lobe member 114 via a plurality of mechanical fasteners 120, with the mounting plate 118 being secured to the air spring mounting brackets 108 by a plurality of mechanical fasteners such as bolts 122. The top plate 116 is secured to an upper mounting plate 124 by a plurality of mechanical fasteners 126. The upper mounting plate 124 is attached to a corresponding vehicle frame rail 14. As best illustrated in FIG. 14, the mounting arrangements 50 are located and configured such that the air spring assemblies 22 are inwardly inclined from the mounting assemblies 50 towards the vehicle frame rails 14 at an angle α, thereby resulting in a lower spring rate and reducing the interaction between the suspension and chassis and improving the control in a vehicle jounce event. Further, the incline of the spring assemblies 22 reduces the overall travel thereof, thereby allows use of rolling-lobe type air springs and reducing the overall cost. Preferably, angle α is between 30° and 45° from vertical, and more preferably between 30° and 35° from vertical, thereby resulting in a natural frequency for the vertical displacement or vibrations of the suspension assembly of less than or equal to about 3 Hz, and more preferably of between about 1 Hz and 2 Hz.

The outwardly-sweeping configuration of the trailing arms 16, 18 (FIG. 12B) in conjunction with the configuration and construction of the mounting arrangements 50, provides for attachment of the trailing arms 16, 18, the spindles 90, and the air spring assemblies 22 in close proximity to one another and in close proximity to the ends of the axle member 20. Preferably, the distance X between the center point of the connection of the trailing arms 16, 18 with the mounting arrangement 50 and the center point of the connection of the spindle 90 with the mounting arrangement 50 is less than or equal to about 6 inches, the distance Y between the center point of the connection between the spindle 90 with the mounting arrangement 50 and the center point of the connection between the air spring assembly 22 with the mounting arrangement 50 is less than or equal to about 14 inches, and the total length Z of the mounting arrangement 50 is less than or equal to about 20 inches.

Figure 3A:
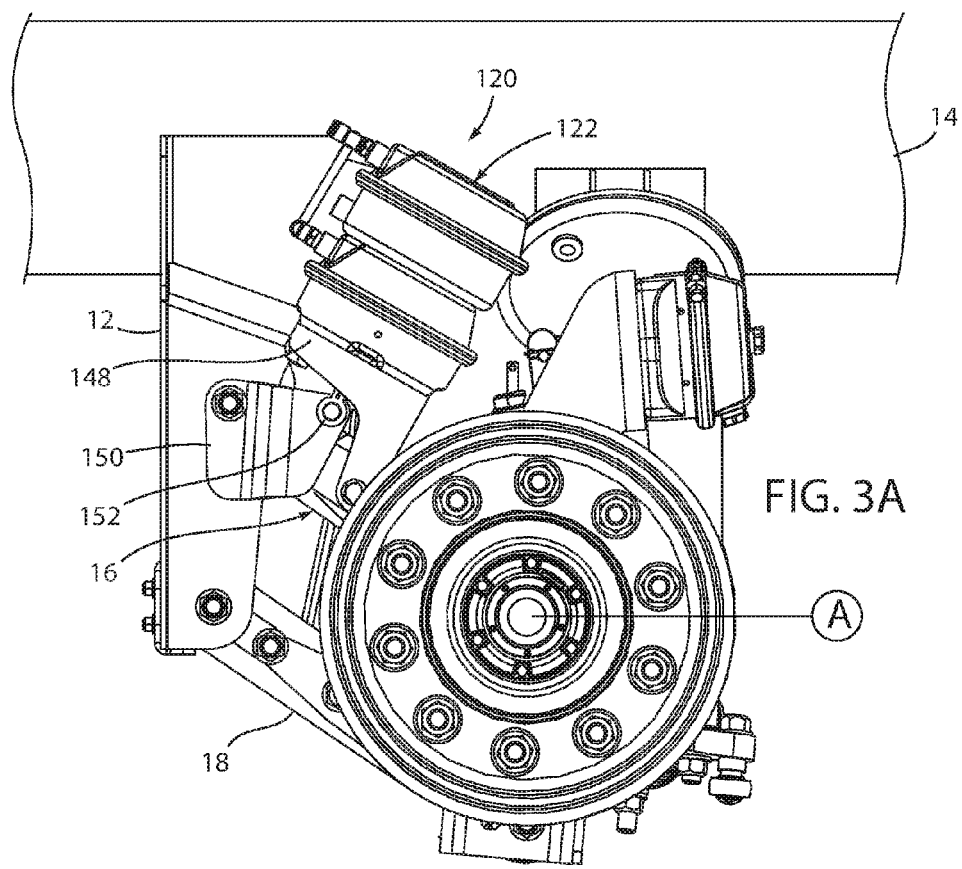
FIG. 3A is a side elevational view of the vehicle suspension assembly in a lowered, in-use position.
Figure 3B:
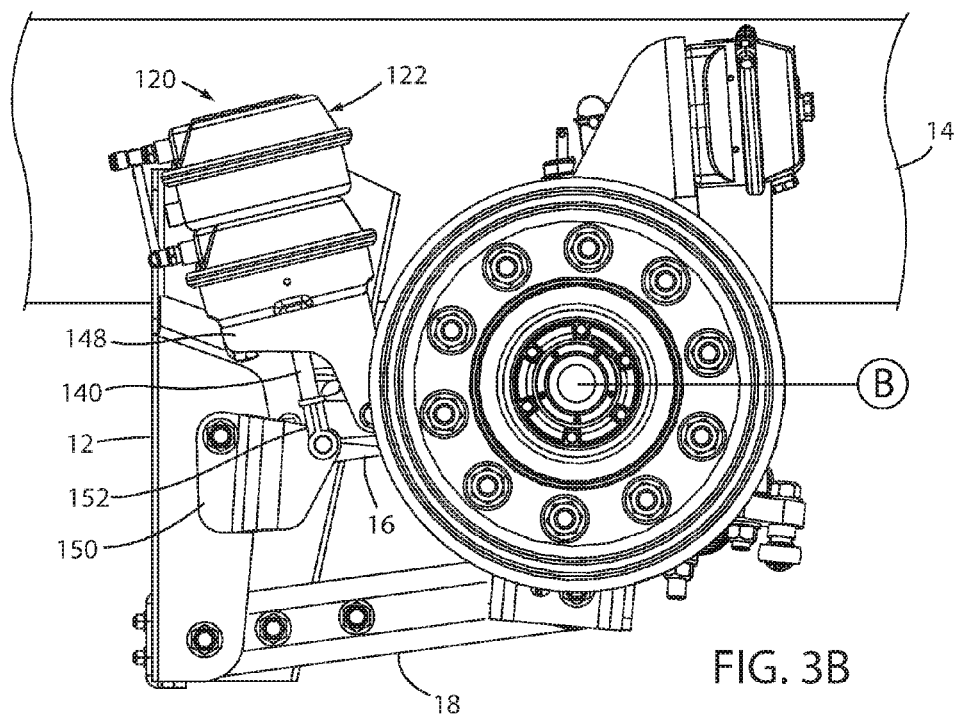
FIG. 3B is a side elevational view of the vehicle suspension assembly in a raised, storage position.
Figure 15A:
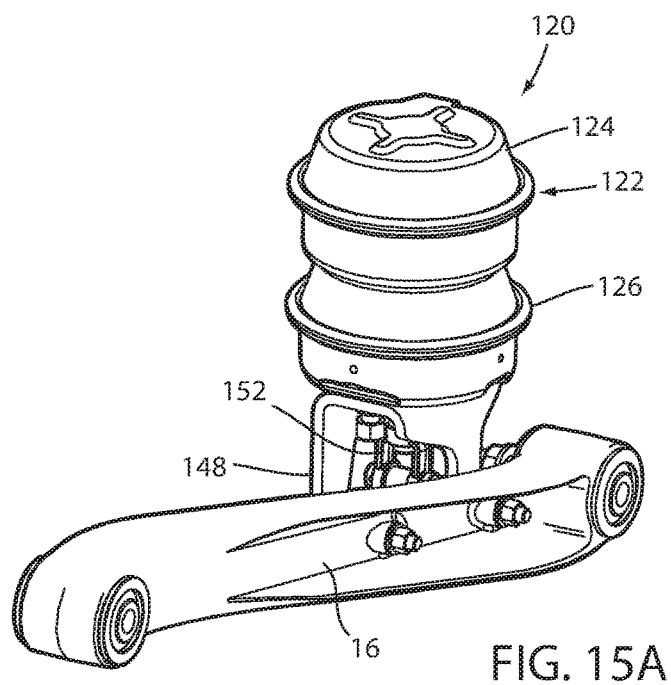
FIG. 15A is a perspective view of a lift arrangement.
Figure 15B:
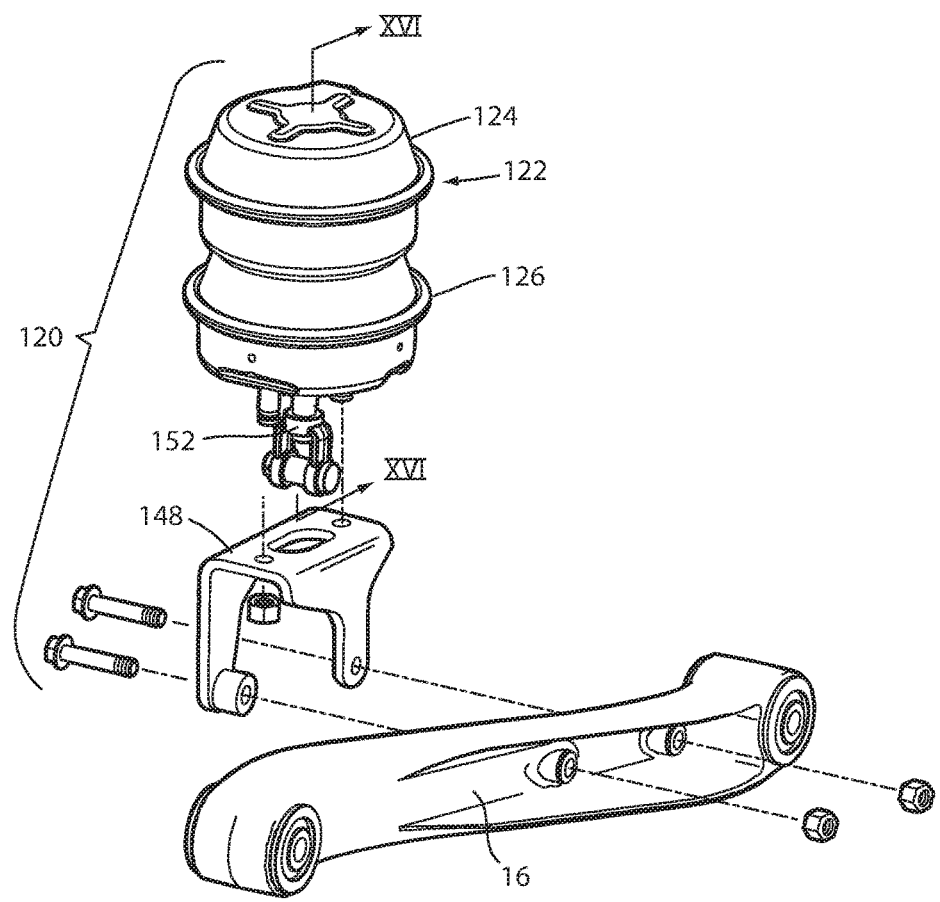
FIG. 15B is an exploded perspective view of the lift arrangement.
Figure 16:
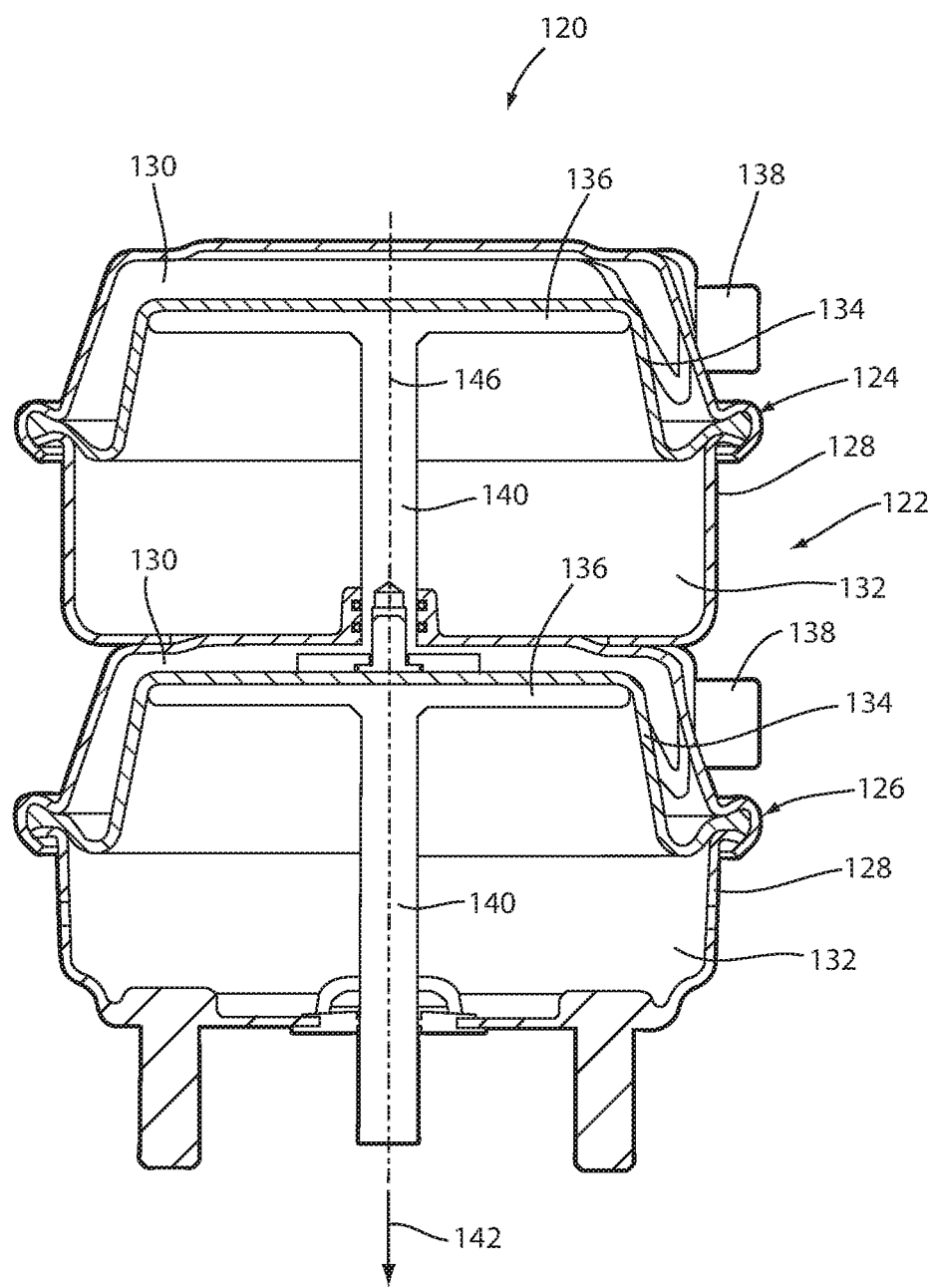
FIG. 16 is a cross-sectional view of a dual diaphragm actuator, taken along the line XVI-XVI, FIG. 15B.

As best illustrated in FIGS. 3A and 3B, the vehicle suspension assembly 10 is vertically adjustable. Specifically, the axle assembly 20 is movable from a lowered position A, wherein the tires 104 contact a ground surface, thereby assisting and supporting the load of the vehicle, and a raised position B, wherein the tires 104 are spaced from the ground surface, thereby reducing tire wear and fuel consumption. The vehicle suspension assembly 10 includes a pair of lift arrangements 120 operably coupled with the associated upper trailing arms 16 and mounting brackets 12. Each lift arrangement 120 includes a dual diaphragm chamber assembly 122 (FIGS. 15A-FIG. 16) including first diaphragm chamber 124 and a second diaphragm chamber 126. Each diaphragm chamber 124, 126 includes a housing 128 divided into an upper chamber 130 and a lower chamber 132 by a deformable diaphragm 134 and a push plate 136, wherein the upper chamber 130 may be pressurized via an air inlet 138. Each push plate 136 is secured to a push rod 140 such that the push rods 140 are each forced in a direction 142 as the upper chamber 138 is pressurized. It is noted that in the illustrated example, the longitudinal axis 146 of each of the push rods 140 are aligned with one another. It is further noted that the dual push rods 140 may be replaced by a single push rod that extends through both the first diaphragm chamber 124 and the second diaphragm chamber 126. The diaphragm chamber assembly 122 is attached to a corresponding upper trailing arm 16 by a lift bracket 148, while the push rod 140 associated with the second diaphragm chamber 126 is pivotably coupled to an associated mounting bracket 12 by a push rod plate 150 that is fixedly coupled to the mounting bracket 12, and a clevis arrangement 152 that is attached to the end of the push rod 140 of the second diaphragm chamber 126 and pivotably coupled to the push rod plate 150. It is noted that the configuration of the diaphragm chamber assembly 122 results in a beveling of the force exerted on the associated push rods 150 while maintaining a reduced overall plan area required to house or position the diaphragm chamber assembly 122 within the overall vehicle suspension assembly 10.

Figure 2:
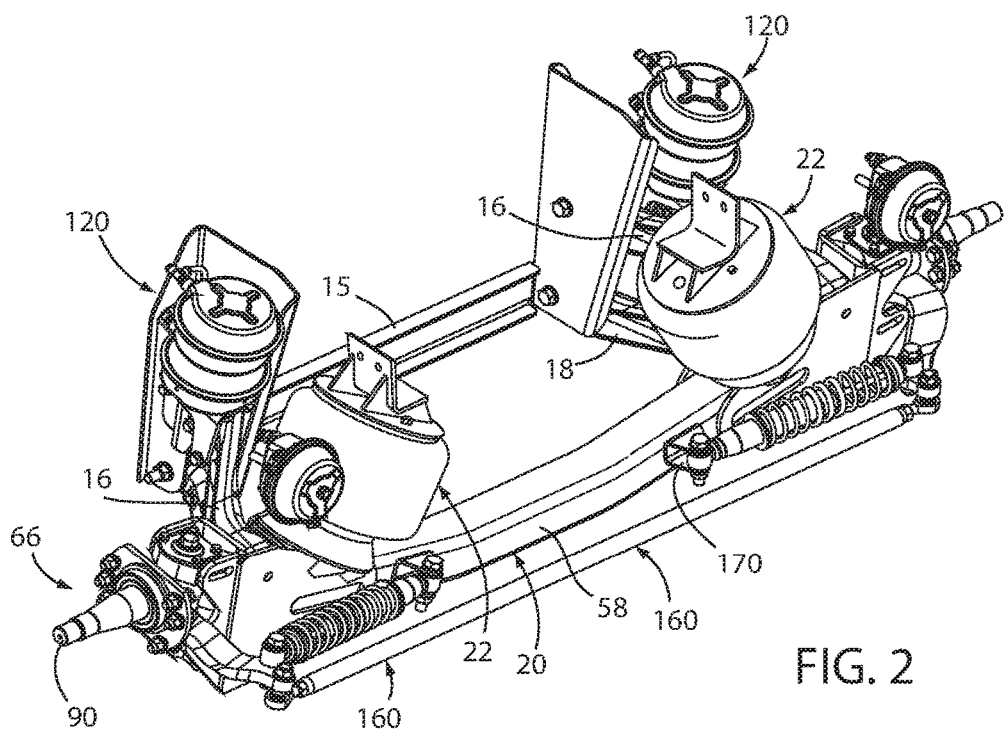
FIG. 2 is a perspective view of the vehicle suspension assembly with wheel and hub assemblies removed.
Figure 4B:
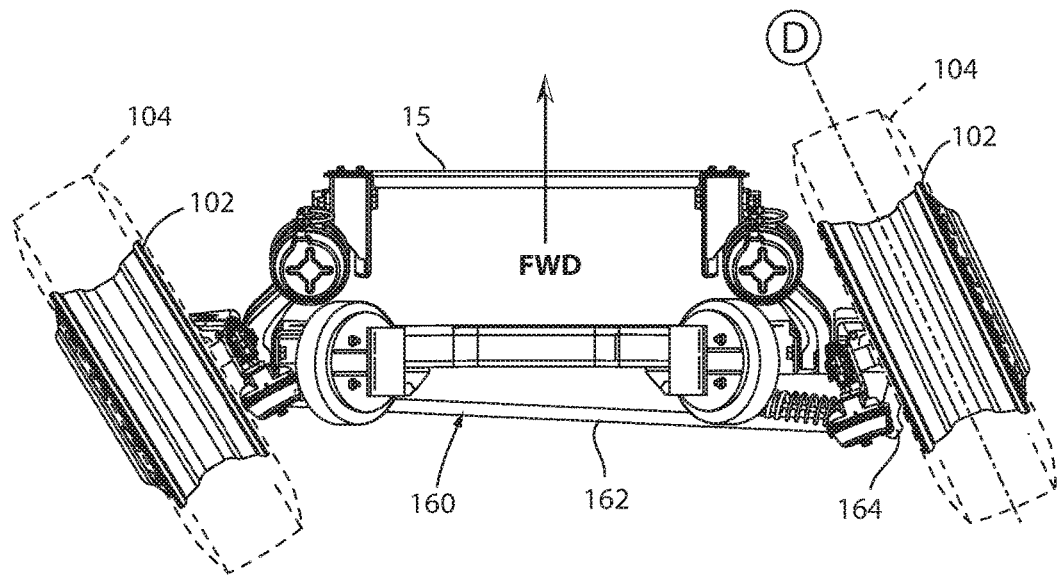
FIG. 4B is a top plan view of the vehicle suspension assembly in a turning orientation.

The vehicle suspension assembly 10 further comprises a self-steer assembly which pivots the spindles 90 and the tires 104 between an inline orientation C, as illustrated in FIG. 4A, and a turning orientation B, as illustrated in FIG. 4B. In the illustrated example, the steering assembly 160 includes a tie rod 162 pivotably coupled to spindle arms 164 (FIG. 14) associated with each spindle 90. The steering assembly 160 further includes a pair of damper assemblies 166 pivotably secured to the spindle arms 164 and the axle 58 via a pair of mounting brackets 170 (FIG. 2).

In the foregoing description it will be readily appreciated by those skilled in the art that modifications may be made to the invention without departing from the concepts as disclosed herein. Such modifications are to be considered as included in the following claims, unless these claims by their express language state otherwise.

The invention claimed is:

1. A method of assembling a vehicle suspension assembly, comprising:
   providing an axle assembly having a first end including a first mounting structure and a second end;
   providing a first bearing block and a second bearing block;
   forming a first aperture in the first bearing block and a second aperture in the second bearing block;
   attaching the first and second bearing blocks to the first mounting structure subsequent to forming the first and second apertures; and
   providing a first spindle assembly coupled to the first mounting structure by a first spherical bearing located within the first aperture and a second spherical bearing located within the second aperture, wherein a first kingpin assembly extends through the first and second spherical bearings, thereby coupling the first spindle assembly with the first mounting structure.

2. The method of claim 1, wherein the step of providing the axle assembly includes providing the second end of the axle assembly with a second mounting structure; and further comprising:
   providing a third bearing block and a fourth bearing block;
   forming a third aperture in the first bearing block and a fourth aperture in the second bearing block;
   attaching the third and fourth bearing blocks to the first mounting structure subsequent to forming the third and fourth apertures; and
   providing a second spindle assembly coupled to the third mounting structure by a third spherical bearing located within the third aperture and a fourth spherical bearing located within the fourth aperture, wherein a second kingpin assembly extends through the third and fourth spherical bearings, thereby coupling the second spindle assembly with the second mounting structure.

3. The method of claim 1, wherein the second bearing block includes a first surface abutting an outer surface of the second spherical bearing, and a second surface extending substantially perpendicular to the first surface and abutting an end surface of the second spherical bearing.

4. The method of claim 1, further comprising:
   tightening the first kingpin assembly to secure the first spindle to the first mounting structure, and such that a load exerted by the first kingpin assembly follows a load path through the first spherical bearing, the first spindle assembly, a spacer washer and the second spherical bearing.

5. The method of claim 1, further comprising:
   providing an air spring, wherein the first mounting structure couples the first end of the axle member to an air spring such that the first air spring is adapted to extend between the first end of the axle assembly and the vehicle frame assembly.

6. The method of claim 5, further comprising:
   providing a trailing arm configured to pivotably couple to a vehicle frame assembly, and wherein the first mounting structure couples the first end of the axle assembly to the trailing arm.

7. The method of claim 6, wherein the first mounting structure is a single, integral piece.

8. The method of claim 1, further comprising:
   providing a trailing arm configured to pivotably couple to a vehicle frame assembly, and wherein the first mounting structure couples the first end of the axle assembly to the trailing arm.

9. The method of claim 8, wherein the first mounting structure is a single, integral piece.

10. The method of claim 1, further comprising:
    providing a trailing arm configured to be pivotably coupled to a vehicle frame, at a first end, and wherein a second end of the trailing arm is located outboard of the first end of the trailing arm.

11. The method of claim 1, further comprising:
    providing a trailing arm configured to be pivotably coupled to a vehicle frame; and
    providing a lift arrangement operably coupled with the trailing arm and configured to move the axle assembly between a first vertical position, wherein a tire coupled to the first end of the axle assembly contacts a ground surface, and a second vertical position, wherein the tire is spaced from the ground surface.

12. The method of claim 1, further comprising:
    a steering arrangement operably coupled with the first spindle assembly, and configured to move a tire coupled to the spindle assembly between a first position defining a first direction of travel, and a second position defining a second direction of travel that is different than the first direction of travel.

\* \* \* \* \*